US011919825B2

United States Patent
Choi et al.

(10) Patent No.: US 11,919,825 B2
(45) Date of Patent: Mar. 5, 2024

(54) ARTIFICIAL MARBLE

(71) Applicant: LOTTE CHEMICAL CORPORATION, Seoul (KR)

(72) Inventors: Jingyu Choi, Uiwang-si (KR); Sanghyun Lee, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 98 days.

(21) Appl. No.: 17/605,099

(22) PCT Filed: Feb. 18, 2020

(86) PCT No.: PCT/KR2020/002337
§ 371 (c)(1),
(2) Date: Oct. 20, 2021

(87) PCT Pub. No.: WO2020/242012
PCT Pub. Date: Dec. 3, 2020

(65) Prior Publication Data
US 2022/0227678 A1  Jul. 21, 2022

(30) Foreign Application Priority Data
May 31, 2019 (KR) .................. 10-2019-0064887

(51) Int. Cl.
| C04B 41/00 | (2006.01) |
| B01J 21/06 | (2006.01) |
| B01J 21/08 | (2006.01) |
| B01J 35/00 | (2006.01) |
| C04B 14/30 | (2006.01) |
| C04B 26/06 | (2006.01) |
| C04B 41/50 | (2006.01) |
| C04B 41/65 | (2006.01) |

(52) U.S. Cl.
CPC ......... *C04B 41/5041* (2013.01); *B01J 21/063* (2013.01); *B01J 21/08* (2013.01); *B01J 35/004* (2013.01); *C04B 14/303* (2013.01); *C04B 26/06* (2013.01); *C04B 41/65* (2013.01)

(58) Field of Classification Search
None
See application file for complete search history.

(56) References Cited

U.S. PATENT DOCUMENTS

| 5,130,113 A * | 7/1992 | Kitayama | ................ C08K 3/22 |
| | | | 501/153 |
| 2002/0134266 A1* | 9/2002 | Yamasaki | .............. B41N 3/036 |
| | | | 101/453 |
| 2007/0218293 A1* | 9/2007 | Kawato | ...................... C08J 5/18 |
| | | | 428/412 |
| 2015/0240107 A1* | 8/2015 | Terasaki | ............... C09D 183/04 |
| | | | 524/556 |

FOREIGN PATENT DOCUMENTS

| CN | 1715593 A | * | 1/2006 | |
| JP | 2001-190344 A | | 7/2001 | |
| JP | 2006-035049 A | | 2/2006 | |
| JP | 2006035049 A | * | 2/2006 | |
| JP | 2010-125357 A | | 6/2010 | |
| KR | 10-2002-0008364 A | | 1/2002 | |
| KR | 2002-0008364 A | * | 1/2002 | .......... G11C 29/808 |
| KR | 20-0271174 Y1 | | 4/2002 | |
| KR | 10-0425913 B1 | | 4/2004 | |
| KR | 10-2004-0062481 A | | 7/2004 | |
| KR | 10-0605090 B1 | | 7/2006 | |
| KR | 10-0875202 B1 | | 12/2008 | |
| KR | 2016-0142702 A | * | 12/2016 | |
| KR | 10-2018-0041543 A | | 1/2019 | |
| WO | 2007/073025 A1 | | 6/2007 | |
| WO | 2020/242012 A1 | | 12/2020 | |

OTHER PUBLICATIONS

KR-2002-0008364-A—English translation (Year: 2002).*
JP-2006035049-A—English translation (Year: 2006).*
KR-20160142702-A—English translation (Year: 2016).*
CN-1715593-A—English translation (Year: 2006).*
International Search Report in counterpart International Application No. PCT/KR2020/002337 dated May 28, 2020, pp. 1-4.
Extended Search Report in counterpart European Patent Application No. 20814978.1 dated May 16, 2023, pp. 1-6.

* cited by examiner

*Primary Examiner* — Stefanie J Cohen
(74) *Attorney, Agent, or Firm* — Additon, Pendleton & Witherspoon, P.A.

(57) ABSTRACT

Provided is artificial marble including an artificial marble substrate having a first surface having an arithmetic mean roughness (Ra) of 1 μm to 12 μm; and a photocatalyst layer directly on the first surface. The artificial marble according to the present invention is lighter than existing natural stone and exhibits excellent thermoformability, and also has excellent antifouling properties by means of a photocatalyst, and thus can be widely used in various fields requiring artificial marble.

16 Claims, 9 Drawing Sheets

ARTIFICIAL MARBLE

CROSS-REFERENCE TO RELATED APPLICATIONS

This application claims priority to and the benefit of International Application No. PCT/KR2020/002337, filed Feb. 18, 2020, which published as WO 2020/242012 on Dec. 3, 2020, and Korean Patent Application No. 10-2019-0064887, filed in the Korean Intellectual Property Office on May 31, 2019, the entire disclosure of each of which is incorporated herein by reference.

TECHNICAL FIELD

The present invention relates to artificial marble.

BACKGROUND ART

As social issues regarding air pollution have recently been highlighted, various methods capable of reducing the air pollution are being discussed. As one of them, a method of applying a photocatalyst to reduce air pollution in building and/or interior/exterior materials and the like is being discussed.

In addition, another method of forming a photocatalyst layer on natural stone such as granite or marble, which is widely used for the building and/or interior/exterior materials, has been discussed. Since the natural stone has relatively high surface roughness and surface porosity, the photocatalyst is easy to apply thereon, and in addition, the natural stone has a beautiful surface pattern and has been used as a building decoration material since ancient times.

However, since the natural stone has different colors on each part and thus exhibits no good overall color uniformity, appearance thereof may be deteriorated. In addition, the natural stone is relatively expensive and has a relatively high specific gravity and so should be handled by a dedicated transport facility or transported by several people, and also, is very difficult to process in appearance such as thermoforming. Accordingly, the natural stone should be designed by considering the specific gravity and difficult processibility and so is restricted on installation location/environment, etc.

Accordingly, there is a need for a new building and/or interior/exterior material being environmentally-friendly and having excellent antifouling properties such as air pollution reduction and the like and thus replacing conventional natural stone.

DISCLOSURE

Technical Problem

An embodiment provides artificial marble that may exhibit both excellent thermoformability and antifouling properties as well as being lighter compared with the existing natural stone.

Technical Solution

According to an embodiment, an artificial marble includes an artificial marble substrate having a first surface having an arithmetic mean roughness (Ra) of 1 μm to 12 μm, and a photocatalyst layer directly on the first surface.

The photocatalyst layer may cover at least a portion of the first surface.

The first surface may include a valley and a ridge, and the photocatalyst layer may fill at least a portion of the valley.

Two or more valleys and two or more ridges may be formed, respectively, and the photocatalytic layer may cover at least one of the two or more ridges.

The photocatalyst layer may completely cover the first surface.

The valley and the ridge may each extend in a first direction.

A standard deviation of an arithmetic mean roughness of the first surface measured based on the first direction may range from 0.3 μm to 2 μm.

A difference in brightness (ΔL) of the first surface measured based on the first direction may range from 0.7 to 3.0.

A maximum height roughness (Ry) of the first surface may range from 5 μm to 50 μm, and a maximum cross-sectional valley height (Rv) may range from 1 μm to 30 μm.

A 10-point average roughness (Rz) of the first surface may range from 5 μm to 40 μm.

The photocatalyst layer may include titanium dioxide ($TiO_2$), zinc oxide (ZnO), cadmium sulfide (CdS), tungsten oxide ($WO_3$), or a combination thereof.

The artificial marble substrate may include a cured product of acrylic resin syrup, and a filler.

The acrylic resin syrup may include an acrylic monomer and a polymer of the acrylic monomer.

The filler may include aluminum hydroxide, magnesium hydroxide, calcium carbonate, talc, or a combination thereof.

The artificial marble substrate may further include an initiator, a crosslinking agent, a coupling agent, a surfactant, a reaction accelerator, an antistatic agent, an antibacterial agent, an antifoaming agent, a dispersing agent, a molecular weight modifier, an ultraviolet absorber, a colorant, or a combination thereof.

The artificial marble may have a flat plate shape or a curved shape.

Advantageous Effects

The artificial marble according to an embodiment is lighter than existing natural stone and exhibits excellent thermoformability, and also has excellent antifouling properties by means of a photocatalyst, and thus can be widely used in various fields requiring artificial marble.

Figure 1:
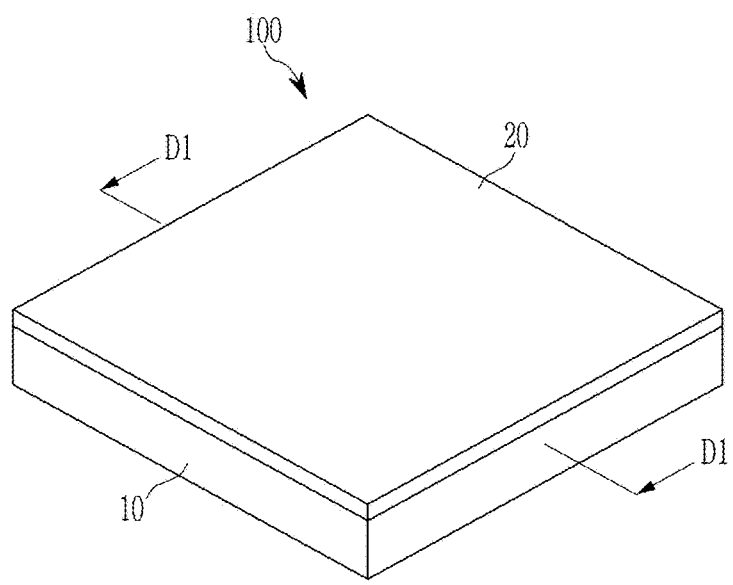
FIG. 1 is a perspective view showing artificial marble according to an embodiment.

| <Description of Symbols> | |
|---|---|
| 10: acrylic artificial marble substrate | 11: first surface |
| 11a: ridge | 11b: valley |
| 12: second surface | 20: photocatalyst layer |
| 100: artificial marble | |

MODE FOR INVENTION

Hereinafter, embodiments of the present invention are described in detail. However, these embodiments are exemplary, the present invention is not limited thereto, and the present invention is defined by the scope of claims.

If not defined otherwise, all terms (including technical and scientific terms) in the specification may be defined as commonly understood by one skilled in the art. Through the specification, in addition, unless explicitly described to the contrary, the word "comprise", and variations such as "comprises" or "comprising", will be understood to imply the inclusion of stated elements but not the exclusion of any other elements. Further, the singular includes the plural unless mentioned otherwise.

In the present specification, surface roughness refers to a degree of fine curvature due to fine concavo-convexities on the surface of an object. In the present specification, the surface roughness of the object is identified by using an arithmetic mean roughness (Ra), a maximum height roughness (Ry), a 10-point average roughness (Rz), and a maximum cross-sectional valley height (Rv).

The arithmetic mean roughness (Ra) is also called a centerline average value and is obtained by drawing a roughness curve of the object surface to take a centerline and averaging absolute values of distances from the centerline to a cross-section curve of the surface within a reference length.

The maximum height roughness (Ry) may be called a maximum roughness and is also expressed as Rmax or Rt. The maximum height roughness (Ry) may be obtained by drawing the roughness curve of the object surface, taking the reference length, and measuring a distance between two parallel lines contacting with the highest ridge and the deepest valley and parallel to the centerline of the cross-sectional curve.

The 10-point average roughness (Rz) may be obtained by drawing the roughness curve of the object surface, taking the reference length, drawing a reference line parallel to an average line of the cross-sectional curve, and calculating a difference between an average of distances from the five highest ridges to the reference line and an average of distances from the five lowest valleys to the reference line.

The maximum cross-sectional valley height (Rv) may be obtained by drawing the roughness curve of the object surface, taking a centerline thereof, and measuring a height from the centerline to the highest cross-sectional valley.

The arithmetic mean roughness (Ra), the maximum height roughness (Ry), the 10-point average roughness (Rz), and the maximum cross-sectional valley height (Rv) are more specifically defined in JIS94 and may be obtained by using a roughness meter (e.g., SJ301, Mitutoyo Corp.).

Natural stone has higher surface roughness and surface porosity than artificial marble, and accordingly, a photocatalyst may be relatively easy to apply as a layer onto the surface. However, the natural stone is limited in expanding applications due to high specific gravity and processability limitations. Accordingly, a method of applying the photocatalyst as a layer onto the surface of an artificial marble substrate has been proposed, but the artificial marble substrate has very high surface smoothness and almost no pores, compared with the natural stone.

In addition, the artificial marble substrate is often installed vertically to have a predetermined inclination with respect to the ground rather than horizontally to lie down during the installation process. Accordingly, when the photocatalyst is coated on the artificial marble substrate surface as a last process, a photocatalyst coating composition may flow down and like due to smooth characteristics of the artificial marble substrate surface and fail in uniformly forming a coating layer, and even if formed, the coating layer may not be firmly attached to the artificial marble substrate surface but may very highly likely fall off.

On the other hand, a method of forming the photocatalyst layer on a separate adhesive layer formed by applying a primer and the like on the artificial marble substrate surface or applying the composition for a photocatalyst coating layer on the artificial marble substrate and heat-treating it has been proposed. However, the methods have concerns of increasing the number of processes according to the formation of the separate layer (adhesive layer) or damaging the artificial marble due to the heat treatment at a high temperature of about 200° C.

Accordingly, another method of manufacturing artificial marble in which the photocatalyst is dispersed (hereinafter, referred to as a photocatalyst blend-type artificial marble) by adding a predetermined amount of the photocatalyst to a composition for artificial marble from the beginning of the artificial marble instead of applying the photocatalyst as a layer has been proposed.

However, in the photocatalyst blend-type artificial marble, the photocatalyst is mainly dispersed thereinside but insignificantly exposed onto the surface. In other words, since a reaction of the photocatalyst occurs due to exposure to external light (e.g., UV and the like), in the photocatalyst blend-type artificial marble, an absolute amount of the photocatalyst exposed to the external light is very small, compared to that of the photocatalyst coating layer. Accordingly, the photocatalyst blend-type artificial marble may be greatly limited in expressing antifouling properties due to the photocatalyst. In addition, the photocatalyst has a property of decomposing organic materials and thus may damage the artificial marble substrate, which is a base material.

Accordingly, the present inventors have studied a method of firmly attaching the photocatalyst as a coating layer onto the artificial marble surface. As a result, the present inventors have discovered that when the photocatalyst coating layer is formed on the artificial marble substrate surface having a predetermined surface roughness, compared with a case of forming the photocatalyst coating layer on a general artificial marble substrate surface (without a particular treatment or by optionally using an adhesive layer or performing a heat treatment) and also, using the photocatalyst blend-type artificial marble, artificial marble having excellent formality of the photocatalyst coating layer and antifouling properties with a minimal process may be provided, completing the present invention.

Figure 2:
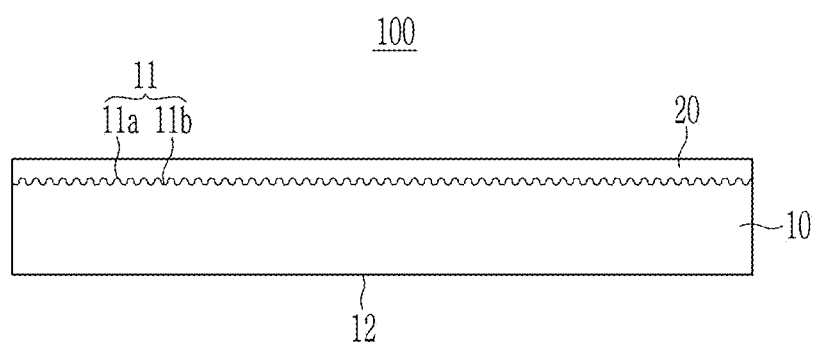
FIG. 2 shows a cross-section taken along D1-D1 of FIG. 1, FIGS. 3 and 4 show examples of photocatalyst layers having various thicknesses according to an embodiment.

FIG. 1 is a perspective view showing artificial marble according to an embodiment, and FIG. 2 shows a cross-section taken along D1-D1 of FIG. 1.

Referring to FIGS. 1 to 2, artificial marble 100 according to an embodiment includes an artificial marble substrate 10 with a first surface 11 having a predetermined surface roughness and a photocatalyst layer 20 disposed right on the first surface 11.

On the other hand, the artificial marble substrate 10 of an embodiment may be obtained by curing a composition for an artificial marble substrate. In an embodiment, the composition for an artificial marble substrate may include a composition for forming an acrylic artificial marble substrate. Accordingly, the artificial marble substrate 10 may include a cured product of an acrylic artificial marble resin syrup, a filler, various additives, and optionally, other components.

The acrylic resin syrup is a component which is a basis of the composition for an artificial marble substrate, and basic properties of the acrylic resin syrup are applied to the composition for an artificial marble substrate.

In an embodiment, the acrylic resin syrup may include an acrylic monomer and a polymer of the acrylic monomer. In other words, the acrylic monomer and the polymer thereof, polymethyl (meth)acrylate, may be dissolved in the acrylic resin syrup.

The acrylic monomer may be methyl (meth)acrylate, ethyl (meth)acrylate, isopropyl (meth)acrylate, n-butyl (meth)acrylate, 2-ethyl hexyl (meth)acrylate, and the like.

On the other hand, each content of the acrylic monomer and the polymer thereof in the acrylic resin syrup may be variously adjusted according to target properties of the artificial marble substrate 10.

In an embodiment, the filler constituting the composition for an acrylic artificial marble substrate may reinforce mechanical properties of the artificial marble substrate 10 and low flame retardancy due to the acryl-base, and in addition, apply a natural stone texture to the artificial marble substrate 10.

The filler may include, for example, aluminum hydroxide, magnesium hydroxide, calcium carbonate, talc, or a combination thereof in order to secure the mechanical properties and flame retardancy-reinforcing effect of the aforementioned artificial marble substrate 10. The materials may exhibit a specific gravity of at least greater than about 2 g/cm$^3$, for example, about 2.1 g/cm$^3$ to about 4 g/cm$^3$.

On the other hand, a content of the filler in the composition for an artificial marble substrate may be variously adjusted according to flame retardancy, formability, processability, and a natural stone texture targeted by artificial marble.

In an embodiment, the composition for an artificial marble substrate may further include various additives to satisfy target properties of the artificial marble substrate 10. The type of the additive is not particularly limited, but may include, for example, an initiator, a crosslinking agent, a coupling agent, a surfactant, a reaction accelerator, an antistatic agent, an antibacterial agent, an antifoaming agent, a dispersing agent, a molecular weight modifier, an ultraviolet absorber, a colorant, or a combination thereof.

The type and/or amount of the additives in the composition for an artificial marble substrate may be variously adjusted according to various properties targeted by artificial marble.

In an embodiment, the artificial marble substrate 10 has the first surface 11 and a second surface 12 facing the first surface 11. The artificial marble 100 according to an embodiment is manufactured by controlling surface roughness of the first surface 11 within a predetermined range to physically firmly bond the photocatalyst layer 20, even though the photocatalyst layer 20 is widely coated as a layer, to the artificial marble substrate 10 without using a separate adhesive layer.

The surface roughness of the first surface 11 may be defined by various factors for identifying surface roughness.

For example, in the surface roughness of the first surface 11, an arithmetic mean roughness (Ra) may be, for example, at least greater than or equal to 1 μm, for example, greater than or equal to 2 μm, for example, less than or equal to 12 μm, for example, less than or equal to 11 μm, for example, less than or equal to 10 μm, for example, less than or equal to 9 μm, for example, less than or equal to 8 μm, for example, 1 μm to 12 μm, for example, 1 μm to 11 μm, for example, 1 μm to 10 μm, for example, 2 μm to 10 μm, for example, 2 μm to 9 μm, or for example, 2 μm to 8 μm.

When the arithmetic mean roughness (Ra) of the first surface 11 is within the above range, the photocatalyst layer 20 may have excellent coating formability and physical bonding to the artificial marble substrate 10. On the other hand, when the arithmetic mean roughness (Ra) is less than 1 μm, fine curvatures due to fine concavo-convexities of the contact surface are insignificant and thus exhibit a relatively smooth surface, deteriorating coating formability and physical bonding property of the photocatalyst layer 20. On the other hand, when the arithmetic mean roughness (Ra) is greater than 12 μm, the fine concavo-convexities of the surface of the artificial marble substrate 10 may be clearly confirmed with the naked eye, deteriorating beauty, and in addition, an amount of the photocatalyst for forming the photocatalyst layer 20 may be undesirably increased.

On the other hand, the surface roughness of the first surface 11 may be identified by other surface roughness evaluation criteria in addition to the aforementioned arithmetic mean roughness (Ra).

In an embodiment, the maximum height roughness (Ry) among the surface roughness of the first surface 11 may be, for example, greater than or equal to 5 μm, for example, greater than or equal to 6 μm, for example, greater than or equal to 7 μm, for example, greater than or equal to 8 μm, for example, greater than or equal to 9 μm, or for example, greater than or equal to 10 μm, and for example, less than or equal to 50 μm, for example, less than or equal to 45 μm, for example, less than or equal to 40 μm, for example, 5 μm to 50 μm, for example, 6 μm to 50 μm, for example, 7 μm to 50 μm, for example, 8 μm to 50 μm, for example, 9 μm to 50 μm, for example, 10 μm to 50 μm, for example, 10 μm to 45 μm, or for example, 10 μm to 40 μm, under the premise that the first surface 11 satisfies the aforementioned arithmetic mean roughness (Ra).

In addition, the maximum cross-sectional valley height (Rv) of the first surface 11 may be, for example greater than or equal to 1 μm, for example, greater than or equal to 2 μm, for example, greater than or equal to 3 μm, for example, greater than or equal to 4 μm, or for example, greater than or equal to 5 μm, and for example, less than or equal to 30 μm, for example, less than or equal to 25 μm, for example, less than or equal to 20 μm, or for example, 1 μm to 30 μm, for example, 2 μm to 30 μm, for example, 3 μm to 30 μm, for example, 4 μm to 30 μm, for example, 5 μm to 30 μm, for example, 5 μm to 25 μm, for example, 5 μm to 20 μm, under the premise that the first surface 11 satisfies the aforementioned arithmetic mean roughness (Ra) and/or maximum height roughness (Rv).

One the other hand, in an embodiment, the 10-point average roughness (Rz) of the surface roughness of the first surface 11 may be for example greater than or equal to 5 μm, for example, greater than or equal to 6 μm, for example, greater than or equal to 7 μm, for example, greater than or equal to 8 μm, for example, greater than or equal to 9 μm, or for example, greater than or equal to 10 μm, and for example, less than or equal to 40 μm, for example, less than or equal to 35 μm, or for example, less than or equal to 30

μm, or for example, 5 μm to 40 μm, for example, 6 μm to 40 μm, for example, 7 μm to 40 μm, for example, 8 μm to 40 μm, for example, 9 μm to 40 μm, for example, 10 μm to 40 μm, for example, 10 μm to 35 μm, for example, 10 μm to 30 μm, under the premise that the first surface 11 satisfies the aforementioned arithmetic mean roughness (Ra).

When the first surface 11 has a maximum height roughness (Ry), and/or a maximum cross-sectional valley height (Rv), and/or a 10-point average roughness (Rz) respectively within the above ranges, excellent coating formability of the photocatalyst layer 20 and physical bonding thereof to the artificial marble substrate 10 are obtained.

On the other hand, the concavo-convexities of the first surface 11 of the artificial marble substrate 10 may include a ridge 11a and a valley 11b. Two or more of the ridges 11a and the valleys 11b may be respectively formed. The two or more of the ridges 11a and the valleys 11b may be alternately aligned to form the fine curvatures of the first surface 11.

In an embodiment, a height/width of the ridge 11a, a height/width of the valley 11b, and a shape of the ridge 11a and/or the valley 11b may be various. For example, through a surface treatment of the first surface 11, two or more of the ridges 11a may be adjusted to have the same or different height, or two or more of the valleys 11b may be adjusted to have the same or different depth.

Figure 3:
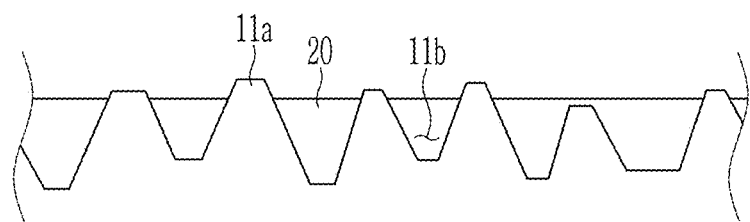
Figure 4:
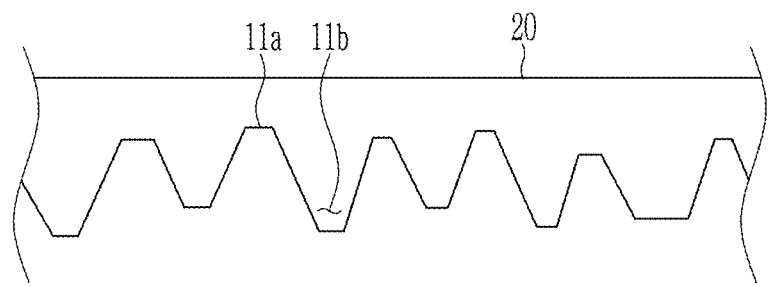

FIGS. 3 and 4 show examples of photocatalyst layers having various thicknesses according to an embodiment.

First, referring to FIG. 3, the photocatalyst layer 20 may fill at least a portion of the valley 11b. In other words, the photocatalyst layer 20 may be disposed at every valley 11b on the first surface 11, and specifically, filled in a portion of the valley 11b or a whole of the valley 11b.

In addition, the photocatalyst layer 20 may cover at least one of the two or more of the ridges 11a. In other words, the photocatalyst layer 20 may have a thickness sufficient to cover even at least one of the ridges 11a as well as at least one of two or more of the valleys 11b.

In other words, the photocatalyst layer 20 may cover, as shown in FIG. 3, a portion and/or whole of the valleys 11b and at least one of two or more of the ridges 11a.

On the other hand, referring to FIG. 4, the photocatalyst layer 20 may be formed to be much thicker, compared with that shown in FIG. 3, and thus completely cover the ridge 11a and the valley 11b. In other words, the photocatalyst layer 20 may completely cover the first surface 11.

Referring to the artificial marble 100 of FIGS. 3 and 4, numerous exemplary variations of the photocatalyst layer 20 obtained by variously adjusting a thickness are shown. In other words, in an embodiment, the thickness of the photocatalyst layer 20 may be variously modified according to the use and a size of the artificial marble 100, materials constituting the photocatalyst and the artificial marble substrate, and the like to secure fine curvatures of the first surface 11 and various arrangements. In addition, even though the thickness of the photocatalyst layer 20 is variously adjusted, the photocatalyst layer 20 may exhibit excellent physical bonding to the artificial marble substrate 10 according to the aforementioned surface roughness of the first surface 11.

Figure 5:
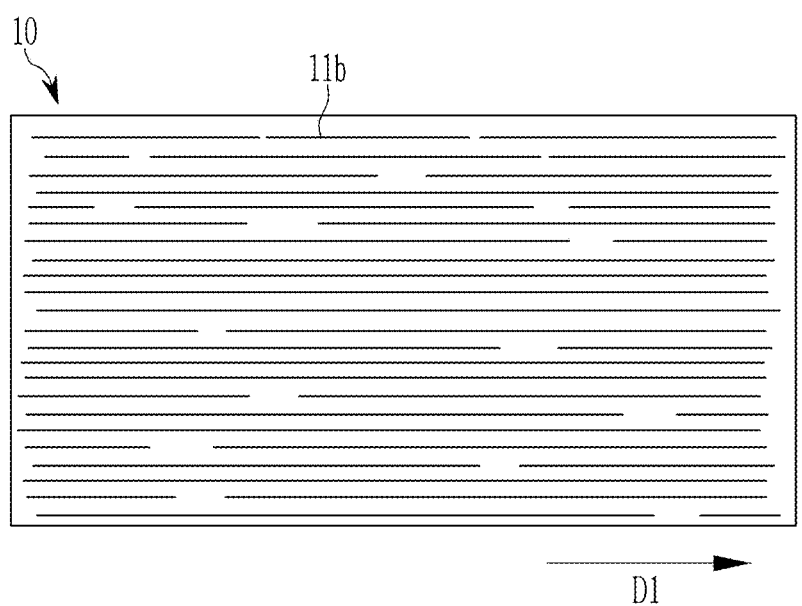
FIG. 5 is a plan view of an artificial marble substrate viewed from the top of the first surface according to an embodiment, emphasizing the valley portion.

FIG. 5 is a plan view of an artificial marble substrate viewed from the top of the first surface according to an embodiment, emphasizing the valley portion. A ridge is formed between two neighboring valleys, and a separate division or mark is omitted in FIG. 5.

In the artificial marble 100 according to an embodiment, each ridge 11a and valley 11b formed on the first surface 11 of the artificial marble substrate 10 may respectively extend along a predetermined axial direction. For example, referring to FIG. 5, the ridge 11a and the valley 11b formed on the first surface 11 may be formed to extend along a D1 axial direction. In other words, the fine curvatures of the first surface 11 formed by the ridge 11a and the valley 11b may be processed to have a predetermined directionality.

A method of processing the fine curvatures of the first surface 11 to have the predetermined directionality may include, for example, reciprocating the polishing means such as a sanding paper, a polishing machine, and the like and/or reciprocating an artificial marble substrate back and forth in the D1 axial direction after contacting the polishing means onto the artificial marble substrate surface, moving the artificial marble substrate before the surface process back and forth toward the polishing means such as a sanding drum and the like in the D1 axial direction, or the like. However, the surface processing method of the fine curvatures of the first surface 11 is not limited thereto, but various known uniaxial processing methods may be applied thereto.

In an embodiment, as the fine curvatures of the first surface 11 are processed to have the predetermined directionality, the arithmetic mean roughness may have a relatively small deviation in the corresponding direction. For example, the arithmetic mean roughness of the first surface measured with respect to a first direction (e.g., the D1 axial direction of FIG. 5) may have a standard deviation of greater than or equal to 0.3 μm, for example, greater than or equal to 0.5 μm, for example, less than or equal to 2 μm, for example, less than or equal to 1.7 μm, for example, 0.3 μm to 2 μm, or for example, 0.5 μm to 1.7 μm.

In general, an artificial marble substrate is surface-polished by using polishing means such as a grinder, a sanding pad, and the like, and accordingly, the polished surface does not have directionality in a uniaxial direction but exhibits random shapes of fine curvatures.

This artificial marble substrate surface having the random shapes of the fine curvatures may not satisfy the standard deviation of the arithmetic mean roughness in the uniaxial direction and/or the brightness difference. In addition, the random shapes of the fine curvatures improve the smoothness of the artificial marble substrate surface but deteriorate coating formality of the photocatalyst layer 20 and physical bonding to the artificial marble substrate 10.

On the contrary, in the artificial marble 100 according to an embodiment, the first surface 11, as shown in FIG. 5, is processed to have directionality in a uniaxial direction (D1 axial direction), securing excellent coating formality of the photocatalyst layer 20 and excellent physical bonding to the artificial marble substrate 10.

On the other hand, as the fine curvatures of the first surface 11 are processed to have a predetermined directionality, a brightness difference (ΔL) in the corresponding direction may become relatively small. For example, the brightness difference of the first surface measured in the first direction may be greater than or equal to 0.7, for example, greater than or equal to 1.0, for example, less than or equal to 3.0, for example, less than or equal to 2.7, for example, 0.7 to 3.0, or for example, 1.0 to 2.7.

In general, a natural stone has a large specific gravity and limited processability and thus is not easy to handle and is limited in the use, and in addition, exhibits relatively low consistency on each part and thus unsatisfactory appearance.

On the contrary, the artificial marble 100 according to an embodiment has a lower specific gravity than the natural stone and thus is easier to handle, and in addition, exhibits a considerably low brightness difference with respect to a uniaxial direction (D1 axial direction) of the first surface 11 within the above range, thereby securing excellent appearance and beauty through color uniformity.

In an embodiment, the second surface 12 may have no photocatalyst layer 20 but has smoother fine curvatures than the first surface 11.

However, an embodiment is not necessarily limited thereto, but fine curvatures of the second surface may be variously adjusted according to the use of the artificial marble 100. For example, the second surface, like the aforementioned first surface, may also be processed to have predetermined surface roughness, or right on the processed second surface, a separate photocatalyst layer may be further formed.

In an embodiment, the photocatalyst layer 20 may include a photocatalyst. The photocatalyst, when irradiated with light (e.g., UV and the like) of a wavelength having energy which is greater than or equal to its own band gap (band gap energy), is activated and generates negatively charged electrons and positively charged holes on the surface and thus hydroxy radicals and peroxygen ions having strong oxidizing and reducing power from water and oxygen in the air, and the generated hydroxy radicals and peroxygen ions have a property of decomposing toxic organic materials around themselves. Accordingly, the photocatalyst layer 20 including the photocatalyst may exhibit excellent antifouling properties due to the photocatalyst.

The photocatalyst layer 20 may be formed by coating a composition including the photocatalyst, a solvent, and optionally, a binder, other additives, and the like right on the first surface, and then curing it. The composition for forming the photocatalyst layer may be applied in a known coating method such as a spray method, a gravure method, a dipping method, and the like.

The photocatalyst may be various known photocatalyst materials, for example, titanium dioxide ($TiO_2$), zinc oxide (ZnO), cadmium sulfide (CdS), tungsten oxide ($WO_3$), or a combination thereof.

In an embodiment, a content of the photocatalyst included in the composition for forming the photocatalyst may be at least greater than or equal to 1 wt %, for example, greater than or equal to 2 wt %, for example, less than or equal to 10 wt %, for example, less than or equal to 9 wt %, for example, less than or equal to 8 wt %, for example, less than or equal to 7 wt %, for example, less than or equal to 6 wt %, for example, less than or equal to 5 wt %, or for example, 1 wt % to 10 wt %, for example, 1 wt % to 9 wt %, for example, 1 wt % to 8 wt %, for example, 1 wt % to 7 wt %, for example, 1 wt % to 6 wt %, or for example, 1 wt % to 5 wt %.

When the content of the photocatalyst included in the composition for forming the photocatalyst satisfies the above ranges, the formed photocatalyst layer 20 may exhibit excellent coating formability and antifouling properties.

As described above, the artificial marble 100 according to an embodiment may secure excellent coating formability of the photocatalyst layer 20 and excellent physical bonding to the artificial marble substrate 10 by adjusting surface roughness of the first surface 11 of the artificial marble substrate 10 directly contacting with the photocatalyst layer 20, and also excellent antifouling properties due to the photocatalyst layer 20.

Accordingly, the artificial marble 100 may be widely applied to fields requiring excellent antifouling properties, for example, various building materials such as interior/exterior walls, countertops/sinks, or flooring materials for living rooms/lobbies, and the like.

On the other hand, the artificial marble 100 according to an embodiment, as shown in FIGS. 1 to 5, may have a flat plate shape but is not limited thereto. For example, the artificial marble 100 may be processed to have various shapes according to thermoformability results.

Figure 6:
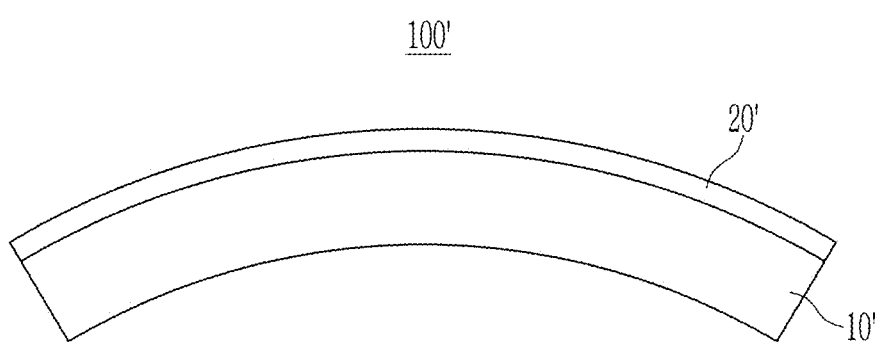
FIG. 6 is a cross-sectional view showing an example of processing of artificial marble according to an embodiment.

FIG. 6 is a cross-sectional view showing an example of processing of artificial marble according to an embodiment.

For example, the aforementioned artificial marble 100 may be processed to have a curve shape through an additional process, like artificial marble 100' shown in FIG. 6. This process may be performed through a thermoforming process. For example, the thermoforming process may use a method of heating the artificial marble 100 with a flat plate shape, fixing the heated artificial marble 100 into a mold having a curved surface shape, and then cooling it. However, specific thermoforming processes are not necessarily limited to the method but may include various known thermoforming methods.

The thermoforming process may be performed within a temperature range performing no damage to the artificial marble 100'. For example, the thermoforming process may be performed at a thermoforming temperature of 100° C. to 200° C., for example, 120° C. to 180° C.

On the other hand, in an embodiment, the artificial marble substrate 10' constituting the artificial marble 100' may be thermoformed at a temperature of 100° C. to 200° C., for example, 120° C. to 180° C., to ensure the aforementioned thermoforming.

Accordingly, the artificial marble substrate 10' and the photocatalyst layer 20' constituting the artificial marble 100' processed to have the curved shape all may be processed to have the same curved shape through the aforementioned thermoforming process.

In this way, even if the artificial marble 100' has the curved shape through the thermoforming as described above, the physical bonding due to the above predetermined surface roughness of the first surface 11 between the artificial marble substrate 10' and the photocatalyst layer 20' may be firmly maintained.

Accordingly, the artificial marble 100' having a curved shape also has excellent antifouling properties and exhibits excellent thermoformability like the artificial marble 100 having a flat shape, and thus may be widely applied to various building materials such as interior/exterior walls, countertops/sinks, or flooring materials for living rooms/lobbies, and the like.

On the other hand, an embodiment is not necessarily limited thereto, but an order of the thermoforming process and the photocatalyst layer-forming process may be variously set depending on target shapes of the artificial marble and fields to which the artificial marble is applied. For example, in another embodiment, an artificial marble substrate having no photocatalyst layer is first thermoformed to have a curved shape under the aforementioned temperature condition, and then a photocatalyst layer is formed on the thermoformed artificial marble substrate surface, obtaining artificial marble.

Hereinafter, the present invention is illustrated in more detail with reference to examples and comparative examples. However, the following examples and comparative examples are provided for the purpose of descriptions and the present invention is not limited thereto.

Example 1

150 parts by weight of aluminum hydroxide with an average particle diameter of 1 μm to 80 μm (H-WF-1, Chalco Shandong Advanced Material Co., Ltd.) was added to 100 parts by weight of an acrylic resin syrup prepared by dissolving 15 wt % of polymethyl methacrylate (Arkema) in 85 wt % of methylmethacrylate and then, sufficiently stirred for 20 minutes.

Subsequently, the completely stirred mixture was vacuumed and defoamed at 740 mmHg for 3 minutes, and 1.5 parts by weight of an initiator (Chemex MOM, Dongsung Highchem Co., Ltd.) were added thereto and then stirred for 1 minute, preparing artificial marble slurry.

The prepared artificial marble slurry was evenly poured into a mold and cured in an oven at 80° C. for 30 minutes, manufacturing an artificial marble substrate having no surface treatment.

Then, the artificial marble substrate having no surface treatment was put into a drum sander (2300 series wide belt sander, Timesaver Inc.) and uniaxially sanded sequentially through a sandpaper drum having a particle size of #60, a sandpaper drum having a particle size of #100, a sandpaper drum having a particle size of #120, a sandpaper drum having a particle size of #180, and a sandpaper drum having a particle size of #320, which were set at a belt speed of 6 m/min and RPM 1800.

The surface processed through the uniaxial sanding exhibited an arithmetic mean roughness (Ra) of 7.55 μm, a maximum height roughness (Ry) of 37.76 μm, a maximum cross-sectional valley height (Rv) of 21.68 μm, and a 10-point average roughness (Rz) of 24.89 μm, and the arithmetic mean roughness had a standard deviation of 1.0 μm, and a brightness difference was 2, based on the sanded axial direction.

Subsequently, right on the sanded surface of the artificial marble substrate, 5 parts by weight of a composition for forming a photocatalyst layer [a composition in which titanium dioxide and silicon dioxide were dissolved in a xylene solvent] was applied with a spray gun and cured at 25° C. for 24 hours, preparing artificial marble according to Example 1. The sanded surface of the artificial marble according to Example 1 was completely covered with a titanium dioxide photocatalyst layer.

Example 2

An artificial marble according to Example 2 was manufactured according to the same method as Example 1 except that the uniaxially-sanded surface exhibited an arithmetic mean roughness (Ra) of 7.02 μm, a maximum height roughness (Ry) of 35.33 μm, a maximum cross-sectional valley height (Rv) of 20.30 μm, and a 10-point average roughness (Rz) of 25.12 μm, and the arithmetic mean roughness had a standard deviation of 1.0 μm, and a brightness difference was 2, based on the processed axial direction.

Comparative Example 1

An artificial marble according to Comparative Example 1 was manufactured according to the same method as Example 1 except that the uniaxially-sanded surface exhibited an arithmetic mean roughness (Ra) of 0.2 μm, a maximum height roughness (Ry) of 1.61 μm, a maximum cross-sectional valley height (Rv) of 0.63 μm, and a 10-point average roughness (Rz) of 1.02 μm, and the arithmetic mean roughness had a standard deviation of 0.1 μm, and a brightness difference was 1.0, based on the processed axial direction.

Comparative Example 2

An artificial marble according to Comparative Example 2 was manufactured according to the same method as Example 1 except that the uniaxially-sanded surface exhibited an arithmetic mean roughness (Ra) of 0.24 μm, a maximum height roughness (Ry) of 1.63 μm, a maximum cross-sectional valley height (Rv) of 0.60 μm, and a 10-point average roughness (Rz) of 1.09 μm, and the arithmetic mean roughness had a standard deviation of 1.0 μm, and a brightness difference was 2, based on the processed axial direction.

Comparative Example 3

150 parts by weight of aluminum hydroxide having an average particle diameter of 1 μm to 80 μm (H-WF-1, Chalco Shandong Advanced Material Co., Ltd.) and 10 parts by weight of the composition for a photocatalyst layer according to Example 1 were added to 100 parts by weight of an acrylic resin syrup prepared by dissolving 15 wt % of polymethyl methacrylate (Arkema) in 85 wt % of methylmethacrylate, and then sufficiently stirred for 20 minutes.

Subsequently, the completely stirred mixture was vacuumed and defoamed at 740 mmHg for 3 minutes, and 1.5 parts by weight of an initiator (Chemex MOM, Dongsung Highchem Co., Ltd.) was added thereto and then stirred for 1 minute, preparing artificial marble slurry.

The prepared artificial marble slurry was evenly poured into a mold and cured in an oven at 80° C. for 30 minutes, manufacturing an artificial marble according to Comparative Example 3.

Evaluation 1: Gas Decomposition Capability of Artificial Marble

The artificial marble according to Example 1 was cut into a specimen having a width of 100 mm×a length of 100 mm×a thickness of 12 mm and evaluated with respect to gas resolution according to ISO 22197. Herein, a light source was UV-A (roughness: 500 μW/cm$^2$), and gas to be decomposed was 120 ppm of acetaldehyde.

The artificial marble according to Example 1 was put into a gas bag charged with the aforementioned acetaldehyde as a test bag, allowed to stand for 2 hours under a condition in which the light source was not operated (dark condition), and then measured with respect to an acetaldehyde residual rate by using a detection tube.

Subsequently, while the artificial marble was allowed to stand for 16 hours under a condition in which the light source was operated (light condition), the acetaldehyde residual rate was measured by using the detector tube.

The acetaldehyde residual rate results under the dark and bright conditions are shown in Table 1.

TABLE 1

| | | Acetaldehyde concentration (ppm) | | | | |
|---|---|---|---|---|---|---|
| Measurement start | Experiment condition | Example 1 | Example 2 | Comparative Example 1 | Comparative Example 2 | Comparative Example 3 |
| Initial (0 hour) | Dark condition | 120 | 120 | 120 | 120 | 120 |
| 2 hours elapsed | (UV-A X, initial - | 120 | 120 | 120 | 120 | 120 |

TABLE 1-continued

| | | Acetaldehyde concentration (ppm) | | | | |
|---|---|---|---|---|---|---|
| Measurement start | Experiment condition | Example 1 | Example 2 | Comparative Example 1 | Comparative Example 2 | Comparative Example 3 |
| | up to 2 hours) | | | | | |
| 6 hours elapsed | Bright condition | 100 | 100 | 100 | 100 | 120 |
| 10 hours elapsed | (UV-A ○, 2 hours | 60 | — | — | — | — |
| 14 hours elapsed | elapsed - 18 hours | 20 | — | — | — | — |
| 18 hours elapsed | elapsed) | 0 | 0 | 60 | 60 | 100 |

Referring to Table 1, under the dark condition, no gas decomposition occurred even after time elapsed, but after switched into the light condition, the gas decomposition gradually occurred, and finally, all the acetaldehyde was decomposed at 18 hours after starting the experiment (16 hours after changing the condition). Referring to the results of Table 1, the aforementioned artificial marble exhibited excellent gas resolution using UV.

Evaluation 2: Photocatalytic Activity of Artificial Marble

The artificial marble according to the examples and the comparative examples were cut into specimens with a width of 100 mm×a length of 100 mm×a thickness of 12 mm, and then evaluated with respect to photocatalytic activity according to JIS94.

Specifically, a predetermined amount of a methylene blue dye (0.3 g in Example 1 and Comparative Example 1 and 1.0 g in Example 2 and Comparative Examples 2 and 3) was dripped on each specimen surface.

Subsequently, after mounting the specimens on a cradle with an inclination of 45° to expose the surfaces coated with the methylene blue dye on the top, an outdoor exposure test was performed for 10 days. During the outdoor exposure test, an amount of the methylene blue dye remaining on the surface of each specimen was checked with the naked eye every 12 hours.

After 10 days had elapsed, photocatalytic activity was evaluated by comparing a level of the methylene blue dye remaining on each specimen with an initial level thereof.

Figure 7:
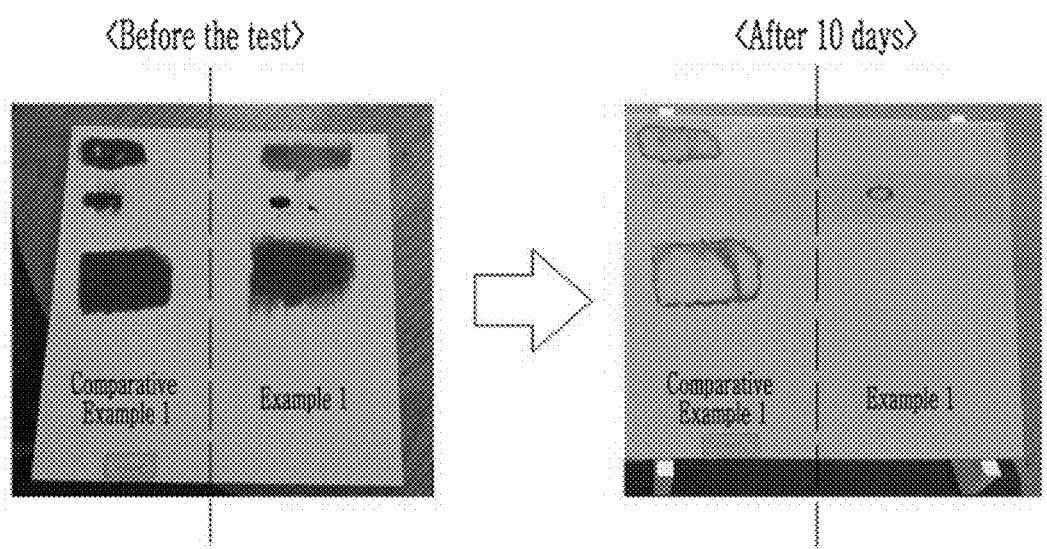
FIG. 7 shows the photocatalytic activity evaluation results of Comparative Example 1 and Example 1.
Figure 8:
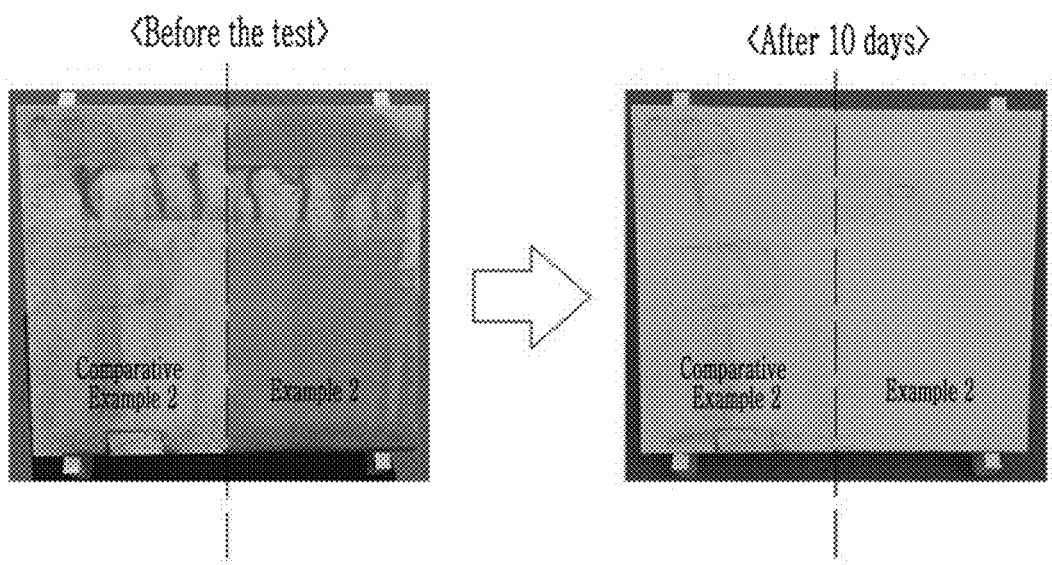
FIG. 8 shows the photocatalytic activity evaluation results of Comparative Example 2 and Example 2.
Figure 9:
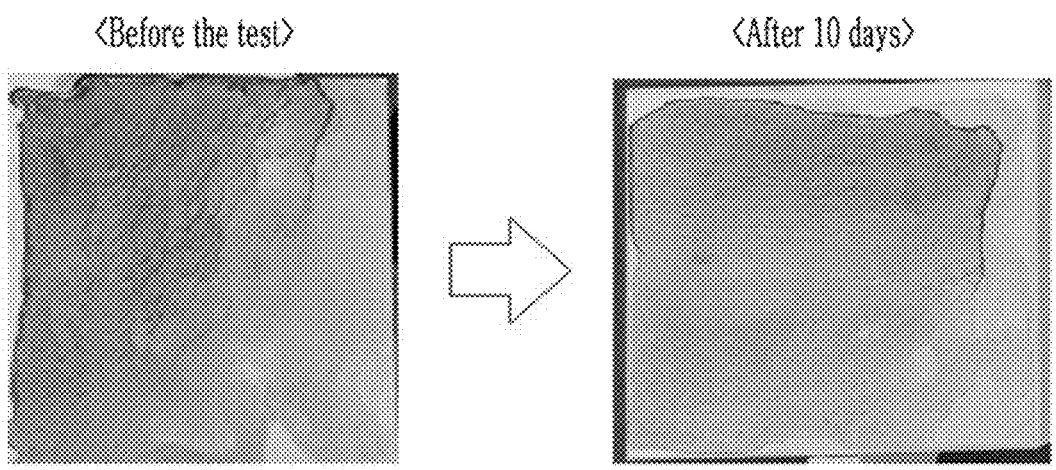
FIG. 9 shows the evaluation results of the photocatalytic activity of Comparative Example 3.

The photocatalytic activity evaluation results of Example 1 and Comparative Example 1 are shown in FIG. 7, the photocatalytic activity evaluation results of Example 2 and Comparative Example 2 are shown in FIG. 8, and the photocatalytic activity evaluation result of Comparative Example 3 is shown in FIG. 9.

Referring to FIGS. 7 and 8, Comparative Examples 1 and 2 exhibiting an arithmetic mean roughness (Ra) of less than 1 μm exhibited that methylene blue remained on the artificial marble surface even after a predetermined time elapsed, whereas the examples exhibiting an arithmetic mean roughness (Ra) of 1 μm to 12 μm exhibited that the methylene blue was almost removed on the surfaces as the predetermined time elapsed.

On the other hand, referring to FIG. 9, the photocatalyst blend-type artificial marble (Comparative Example 3) exhibited that the methylene blue remained on the artificial marble surface even after the predetermined time elapsed.

Accordingly, referring to the results of FIGS. 7 to 9, when a photocatalyst layer was formed right on the artificial marble substrate having a predetermined surface roughness, artificial marble having excellent coating formability and antifouling properties was realized.

Although the present invention has been described through preferred embodiments as described above, the present invention is not limited thereto, and those in the technical field to which it belongs will readily understand that various modifications and variations may be possible without departing from the concept and scope of the following claims.

The invention claimed is:

1. An artificial marble, comprising:
   an artificial marble substrate having a first surface having an arithmetic mean roughness (Ra) of 7.02 μm to 10 μm; and
   a photocatalyst layer directly on the first surface.

2. The artificial marble of claim 1, wherein the photocatalyst layer covers at least a portion of the first surface.

3. The artificial marble of claim 2, wherein
   the first surface comprises a valley and a ridge, and
   the photocatalyst layer fills a portion of the valley.

4. The artificial marble of claim 3, wherein
   two or more valleys and two or more ridges may be formed, respectively, and
   the photocatalytic layer covers at least one of the two or more ridges.

5. The artificial marble of claim 1, wherein the photocatalyst layer completely covers the first surface.

6. The artificial marble of claim 1, wherein the valley and the ridge each extend in a first direction.

7. The artificial marble of claim 6, wherein a standard deviation of an arithmetic mean roughness of the first surface measured based on the first direction ranges from 0.3 μm to 2 μm.

8. The artificial marble of claim 6, wherein a difference in brightness (ΔL) of the first surface measured based on the first direction ranges from 0.7 to 3.

9. The artificial marble of claim 1, wherein a maximum height roughness (Ry) of the first surface ranges from 5 μm to 50 μm, and a maximum cross-sectional valley height (Rv) ranges from 1 μm to 30 μm.

10. The artificial marble of claim 1, wherein a 10-point average roughness (Rz) of the first surface ranges from 5 μm to 40 μm.

11. The artificial marble of claim 1, wherein the photocatalyst layer comprises titanium dioxide ($TiO_2$), zinc oxide (ZnO), cadmium sulfide (CdS), tungsten oxide ($WO_3$), or a combination thereof.

12. The artificial marble of claim 1, wherein the artificial marble substrate comprises a cured product of acrylic resin syrup and a filler.

13. The artificial marble of claim 12, wherein the acrylic resin syrup comprises an acrylic monomer and a polymer of the acrylic monomer.

14. The artificial marble of claim 12, wherein the filler comprises aluminum hydroxide, magnesium hydroxide, calcium carbonate, talc, or a combination thereof.

15. The artificial marble of claim 1, wherein the artificial marble has a flat plate shape.

16. The artificial marble of claim 1, wherein the artificial marble has a curved shape.

\* \* \* \* \*